(12) United States Patent
Zhang et al.

(10) Patent No.: US 10,861,686 B2
(45) Date of Patent: Dec. 8, 2020

(54) AUTOMATIC CALIBRATION DEVICE AND ION MIGRATION SPECTROMETER

(71) Applicant: NUCTECH COMPANY LIMITED, Beijing (CN)

(72) Inventors: Yangtian Zhang, Beijing (CN); Guangqin Li, Beijing (CN); Bin Xue, Beijing (CN); Zhanhong Jia, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 16/058,266

(22) Filed: Aug. 8, 2018

(65) Prior Publication Data

US 2019/0088458 A1   Mar. 21, 2019

(30) Foreign Application Priority Data

Sep. 19, 2017   (CN) .......................... 2017 1 0856368

(51) Int. Cl.
| | |
|---|---|
| *H01J 49/00* | (2006.01) |
| *H01J 49/04* | (2006.01) |
| *G01N 35/10* | (2006.01) |
| *F04B 9/04* | (2006.01) |
| *F04B 23/02* | (2006.01) |

(Continued)

(52) U.S. Cl.
CPC .......... *H01J 49/0009* (2013.01); *F04B 9/045* (2013.01); *F04B 13/00* (2013.01); *F04B 17/03* (2013.01); *F04B 23/02* (2013.01); *G01N 27/622* (2013.01); *G01N 35/00693* (2013.01); *G01N 35/1016* (2013.01); *G01N 35/1095* (2013.01); *H01J 49/04* (2013.01); *H01J 49/0431* (2013.01); *F04B 2201/1208* (2013.01); *F04B 2205/09* (2013.01)

(58) Field of Classification Search
None
See application file for complete search history.

(56) References Cited

U.S. PATENT DOCUMENTS

| | | | | |
|---|---|---|---|---|
| 3,877,287 | A | * 4/1975 | Duntz, Jr. .......... | G01F 25/0007 73/1.22 |
| 5,547,351 | A | 8/1996 | Hanus | |

(Continued)

FOREIGN PATENT DOCUMENTS

| | | |
|---|---|---|
| CN | 101936947 A | 1/2011 |
| CN | 102565177 A | 7/2012 |

(Continued)

OTHER PUBLICATIONS

Extended European Search Report for corresponding European Patent Application No. 18188668.0 dated Nov. 28, 2018, 9 pages.

(Continued)

*Primary Examiner* — James Choi
(74) *Attorney, Agent, or Firm* — Merchant & Gould P.C.

(57) ABSTRACT

Embodiments of the present disclosure provide an automatic calibration device for an ion migration spectrometer and an ion migration spectrometer. The automatic calibration device includes: a reservoir configured to store liquid calibration sample therein; and an automatic transfer portion communicated with the reservoir and configured to transfer the liquid calibration sample in the reservoir.

7 Claims, 1 Drawing Sheet

(51) Int. Cl.
    *F04B 17/03*     (2006.01)
    *G01N 35/00*     (2006.01)
    *F04B 13/00*     (2006.01)

(56) References Cited

U.S. PATENT DOCUMENTS

| | | | | |
|---|---|---|---|---|
| 6,164,924 | A * | 12/2000 | Gruett | F04B 13/00 |
| | | | | 222/231 |
| 7,942,652 | B1 * | 5/2011 | Murray | F04B 9/045 |
| | | | | 417/328 |
| 2006/0147351 | A1 | 7/2006 | Falb et al. | |
| 2018/0223826 | A1 * | 8/2018 | Jeon | F04B 43/00 |

FOREIGN PATENT DOCUMENTS

| | | |
|---|---|---|
| CN | 104653426 A | 5/2015 |
| CN | 106645513 A | 5/2017 |
| CN | 207611013 U | 7/2018 |
| EP | 1 589 336 A1 | 10/2005 |
| EP | 2 613 140 A1 | 7/2013 |

OTHER PUBLICATIONS

Chinese Office Action for corresponding Chinese Patent Application No. 201710856368.1 dated Mar. 14, 2019, 14 pages, English translation.

* cited by examiner

US 10,861,686 B2

AUTOMATIC CALIBRATION DEVICE AND ION MIGRATION SPECTROMETER

CROSS-REFERENCE TO RELATED APPLICATION

This application claims the priority benefit of Chinese Patent Application No. 201710856368.1 titled "AUTOMATIC CALIBRATION DEVICE AND ION MIGRATION SPECTROMETER" filed on Sep. 19, 2017 in the State Intellectual Property Office of China, the whole disclosure of which is incorporated herein by reference.

TECHNICAL FIELD

Embodiments of the present disclosure relate to technical field of ion migration spectrum measurement, and particular to an automatic calibration device and an ion migration spectrometer.

BACKGROUND

An ion migration spectrometer is a widely-used instrument. Commonly, it is required to introduce a certain amount of calibration material into the ion migration spectrometer to calibrate a peak position.

In a conventional equipment, it is needed to provide a calibration device containing a calibration material. As the calibration material is commonly a volatile organic matter and cannot be held for a long time, storage of the calibration material is time-and-labor-consuming, and is inconvenient. In addition, a conventional calibration device needs to be added therein a large amount of calibration material, which causes the calibration material to be consumed quickly and thus much time is spent on cleaning the device, affecting detection efficiency of the ion migration spectrometer.

SUMMARY

Embodiments of the present disclosure provide an automatic calibration device for an ion migration spectrometer, and an ion migration spectrometer, which achieve fixed quantity and automatic continuous transfer and injection of liquid calibration sample, and have advantages of high accuracy, convenient usage, easy portability and long period for one-time addition of calibration sample.

According to an aspect of the present disclosure, there is provided an automatic calibration device for an ion migration spectrometer, including:

a reservoir configured to store liquid calibration sample therein; and an automatic transfer portion communicated with the reservoir and configured to transfer the liquid calibration sample in the reservoir.

As an aspect, the automatic transfer portion comprises: a piston conduit arranged within the automatic transfer portion and configured to be fluidly communicated with the reservoir; and a piston configured, within the piston conduit, to reciprocate right and left so as to output a certain amount of liquid calibration sample in the piston conduit that is transferred from the reservoir.

As an aspect, the automatic transfer portion further comprises: a first eccentric configured to abut against a stop plate that is connected with the piston so as to push, by its rotation, the stop plate and in turn the piston to move in a radial direction of the first eccentric wheel; and an electric machine configured to drive the first eccentric to rotate.

As an aspect, the first eccentric has a fixed dimension such that the first eccentric pushes the stop plate and thus the piston to translate by a constant distance along a radial direction of the first eccentric when the first eccentric rotates for one circle.

As an aspect, the first eccentric is replaceable such that it enables to transfer various amounts of calibration sample as required by using eccentrics with various sizes.

As an aspect, the first eccentric is continuously rotatable such that a total amount of the liquid calibration sample transferred by the piston is obtained by multiplying the amount at one circle of rotation of the first eccentric with the number of the circles of the rotation of the first eccentric wheel.

As an aspect, the automatic transfer portion further includes: an elastic element configured to provide an elastic force in a direction opposite to a direction of a force for driving the piston by the first eccentric wheel.

As an aspect, the automatic transfer portion further comprises a communication conduit, an inlet port of the communication conduit is connected to the reservoir, and an outlet port of the communication conduit is configured adjacent to an end of the piston conduit and connected to the piston conduit such that, as the piston is moved, the liquid calibration sample in the communication conduit is allowed to be suctioned to a space defined between an end face of the piston and an inner end face of the piston conduit, in the piston conduit.

As an aspect, the automatic transfer portion further comprises: a one-way valve provided at the outlet port of the communication conduit and configured to allow the liquid calibration sample to enter the piston conduit from the reservoir and to block the liquid calibration sample in the piston conduit from entering the reservoir.

As an aspect, the automatic transfer portion further comprises: a transferring pipe fluidly communicated with the piston conduit such that the liquid calibration sample in the piston conduit is transferable to an ion migration spectrometer through the transferring pipe.

As an aspect, the transferring pipe comprises a transferring pipe inner portion and a transferring pipe outer portion, and a gap is defined between the transferring pipe outer portion and the transferring pipe inner portion and configured for transferring of liquid.

As an aspect, the automatic transfer portion further comprises: a second eccentric having a same dimension as the first eccentric and configured to abut against the stop plate at a side of the stop plate opposite to the first eccentric so as to cooperate with the first eccentric to rotate together in a same direction or in opposite directions such that the stop plate reciprocates.

Embodiments of the present disclosure further provide an ion migration spectrometer comprising the automatic calibration device as described above.

BRIEF DESCRIPTION OF THE DRAWINGS

Figure 1:
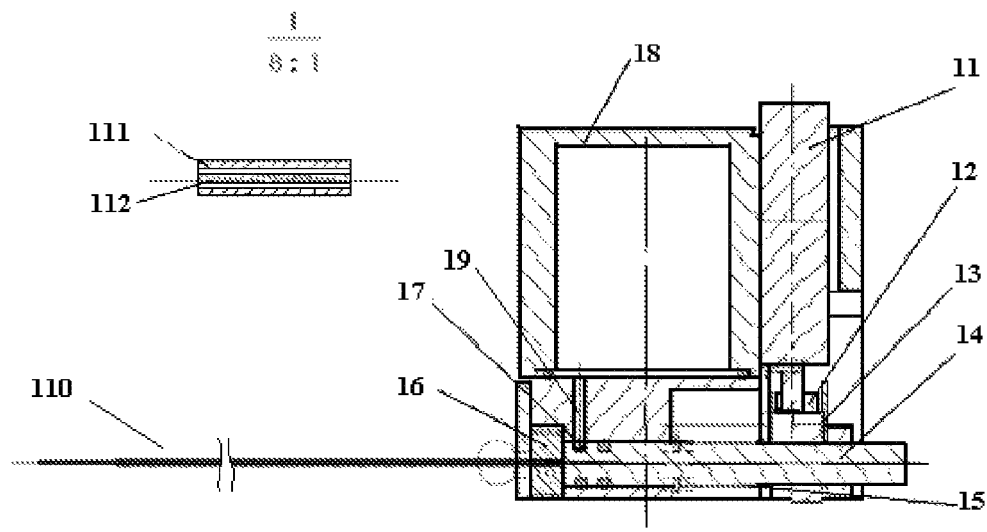
FIG. 1 is a schematic view of an automatic calibration device of an embodiment of the present disclosure.

Although the present invention permits various modifications and replacement, specific embodiments are illustrated in the drawings as examples and described in detail in this text. However, it is understood that the drawings and the detailed description is not intended to limit the present disclosure to the disclosed embodiments, instead of, to cover all modifications, equivalents and replacements of the embodiments which fall into scope and inspirits defined by the claims. The drawings are provided schematically rather than in scale.

Embodiments of the present disclosure are described with reference to the drawings.

Embodiments of the present disclosure provide an automatic calibration device 10 for an ion migration spectrometer, including: a reservoir 18 configured to store liquid calibration sample; and, an automatic transfer portion communicated with the reservoir 18 and configured to transfer the liquid calibration sample in the reservoir 18. In an embodiment, the reservoir 18 has a big volume relative to an amount of sample consumed or used for one time calibration. As such, the automatic calibration device 10 may be used for a relative long period after the reservoir 18 having been filled with calibration sample, without frequently adding calibration sample to the automatic calibration device 10. In an embodiment, the reservoir 18 and the automatic transfer portion are formed as an integral or one-piece structure. As the automatic calibration device 10 includes the reservoir 18, it is easy to be carried without taking care of leakage of such as liquid volatile sample during transfer or transportation of the automatic calibration device 10. As the reservoir 18 and the automatic transfer portion are formed as an integral or one-piece structure, the calibration sample may be directly transferred to the automatic transfer portion within the automatic calibration device 10, thereby reducing loss of the calibration sample and increasing accuracy of calibration.

In an embodiment of the present disclosure, the automatic transfer portion includes: a piston conduit arranged within the automatic transfer portion and configured to be fluidly communicated with the reservoir 18; and, a piston 14 configured, within the piston conduit, to reciprocate right and left so as to output a certain amount of liquid calibration sample in the piston conduit that is transferred from the reservoir 18. As shown in FIG. 1, in a situation where the automatic calibration device 10 is placed horizontally, the piston conduit extends in a horizontal direction and the piston 14 reciprocates right and left in the horizontal direction. It is appreciated that it is not necessary the piston conduit extends in the horizontal direction, and FIG. 1 only shows a manner of extension of the piston conduit. In another embodiment, the piston conduit may extend in another direction without affecting transfer of the calibration sample. When the piston 14 reciprocates within the piston conduit, a movement of the piston 14 may draw out liquid calibration sample from the reservoir 18 and output the liquid calibration sample from the piston conduit.

In the automatic calibration device according to an embodiment of the present disclosure, the automatic transfer portion further includes: a first eccentric wheel 12 configured to abut against a stop plate 13 that is connected with the piston 14 so as to push, by its rotation, the stop plate 13 and in turn the piston 14 to move in a radial direction of the first eccentric wheel 12; and an electric machine 11 configured to drive the first eccentric wheel 12 to rotate. Provision of the stop plate 13 is advantageous. In use, the stop plate 13 tends to be worn out and wearing of the stop plate will affect amount of liquid that is transferred each time by the automatic calibration device, degrading accuracy of injection of the liquid sample, which need to be particularly taken in account for a precision injection. In an embodiment, due to provision of the stop plate 13, the stop plate 13 may be made of a wear-resistant material that is not necessary to be the same as the piston, thereby reducing cost of the apparatus/device. In addition, it is easier to replace the stop plate, instead of the whole piston (where the stop plate is not provided and the first eccentric wheel abuts against an end of the piston). As an outer diameter of the first eccentric wheel 12 is varied, a distance between an outer surface of the first eccentric wheel 12 and a rotation axis thereof changes, for example from a shortest distance from the rotation axis to a longest distance from the rotation axis and then gradually becomes the shortest distance from the rotation axis again, when the first eccentric 12 rotates about the rotation axis. Of course, vice versa, i.e., the longest distance from the rotation axis changes to the shortest distance and then the shortest distance gradually changes to the longest distance from the rotation axis again as the first eccentric 12 continually rotates. In the embodiment, by providing the electric machine 11, transfer of calibration sample may be out of manual operation; due to usage of the eccentric wheel, an amount of the transfer of calibration sample may be constant for each time, increasing calibration accuracy; cooperation between the electric machine 11 and the first eccentric 12 allows the transfer of calibration sample to be done automatically at a constant amount. The first eccentric wheel 12 has an eccentricity ranged from 0.5 mm to 2 mm, that is, a difference value between the biggest diameter and the shortest diameter of the first eccentric wheel 12 may be 4 mm, or may be 1 mm, or may be in a range from 4 mm to 1 mm. In other embodiments, the eccentricity of the first eccentric wheel 12 may be other values and may be set as required. A transferred volume in an order of micro-litre may be achieved by configuring a size of the first eccentric wheel 12.

In another embodiment of the present disclosure, the first eccentric wheel 12 abuts against an end of the piston 14 such that the piston 14 is pushed by the first eccentric wheel 12 by rotation of the first eccentric wheel 12, so as to move in the radial direction of the first eccentric wheel 12.

According to embodiments of the present disclosure, once the first eccentric wheel 12 is set, its dimension is fixed such that the first eccentric wheel 12 pushes the stop plate and thus the piston 14 to move by a constant distance in the radial direction of the first eccentric 12 when the first eccentric wheel 12 rotates for one circle or one complete turn. Thereby, during one circle rotation of the first eccentric wheel 12, the piston 14 may provide a fixed amount of liquid calibration sample.

According the embodiment of the present disclosure, the first eccentric wheel 12 herein may be replaced and eccentric wheels with various sizes may be used to transfer calibration sample at different amounts. According to embodiment of the present disclosure, the first eccentric wheel 12 may be replaced such that eccentric wheels having different dimensions may be provided, that is, the difference value between the biggest outer diameter and the smallest outer diameter of the first eccentric wheel 12 may be set as required, such that a stroke of the piston 14 may be designed and further the amount of the calibration sample to be transferred may be determined.

According the embodiment of the present disclosure, the automatic calibration device 10 is further advantageous in that the first eccentric wheel 12 may be continuously rotated and the piston 14 thus may be reciprocated continuously with the continuous rotation of the first eccentric wheel 12 to provide liquid calibration sample, so that a total amount of the liquid calibration sample may be obtained by multiplying the amount of the liquid calibration sample transferred at one circle of rotation of the first eccentric wheel 12 with the number of the circles of rotation of the first eccentric wheel 12. Thus, based on the constant or fixed amount of calibration sample to be transferred at one circle of rotation of the first eccentric wheel 12, the first eccentric wheel 12 may be rotated for numerous circles when more calibration sample is needed, thereby achieving accurate calibration. Further, as the electric machine 11 is provided for driving the first eccentric wheel 12, transfer process becomes particularly rapid and convenient, such that a detection process thus becomes convenient and detection period is shortened.

The automatic transfer portion may further include a second eccentric wheel 12' that has a same dimension as the first eccentric wheel 12. The second eccentric wheel 12' is configured to abut against the stop plate 13 and arranged at opposite side of the stop plate 13 relative to the first eccentric wheel 12. The second eccentric wheel 12' cooperates with the first eccentric wheel 12 to rotate in a direction that is the same as or opposite to that of the first eccentric wheel 12, such that the stop plate 13, sandwiched between the first eccentric wheel 12 and the second eccentric wheel 12', reciprocates.

Figure 2:
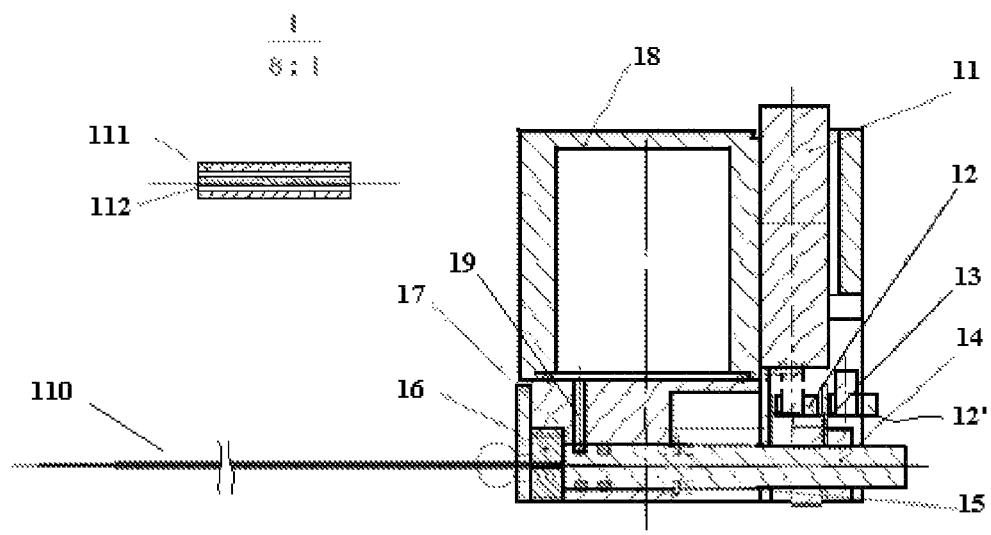
FIG. 2 is a schematic view of an automatic calibration device of another embodiment of the present disclosure.

In another embodiment, two eccentric wheels sandwich the stop plate 13 on the piston 14 to reciprocate right and left as shown in FIG. 2. For example, when the smallest outer diameter surface or portion of the first eccentric wheel 12 abuts against the stop plate 13, the biggest outer diameter surface or portion of the second eccentric wheel 12' abuts against the stop plate 13. The first eccentric wheel 12 may rotate in the same direction as the second eccentric wheel 12' such that the outer diameter of the portion of the first eccentric wheel 12 abutting against the stop plate becomes increased while that of the second eccentric wheel 12' becomes reduced, and the piston 14 is pushed to move towards right. When the first eccentric wheel 12 abuts against the stop plate 13 at its biggest outer diameter portion or position, the second eccentric wheel 12' abuts against the stop plate 13 at its smallest outer diameter portion or position, and at this time, the stop plate 13 is moved to the rightmost position; the first eccentric wheel 12 continues to rotate and the stop plate 13 is pushed by the increasing outer diameter of the second eccentric wheel 12' to the left such that the piston 14 moves towards left, pushing the liquid calibration sample and outputting it from the piston conduit. In an embodiment, the first eccentric wheel 12 and the second eccentric wheel 12' are each driven by an electric machine 11. In another embodiment, the first eccentric wheel 12 and the second eccentric wheel 12' are respectively driven by two electric machines 11 respectively. Provision of two eccentric wheels is advantageous because the stop plate may be sandwiched between the first eccentric wheel 12 and the second eccentric wheel 12' and thus the stop plate may be translated more stably, avoiding off-contact between the stop plate and the first eccentric wheel 12 during translation at a high speed if only the first eccentric wheel is included in the device.

In an embodiment of the present disclosure, only the first eccentric wheel 12 is provided. The automatic transfer portion further includes an elastic element 15 configured to provide an elastic force in a direction opposite to the direction of a force for driving the piston 14 by the first eccentric wheel 12. For example, the elastic element 15 provides a pulling force that pulls the piston 14 (as shown in FIG. 1) towards left while the first eccentric wheel 12 reacts against the pulling force from the elastic element 15 and pushes the stop plate and in turn the piston 13 towards right. When the first eccentric wheel 12 abuts, at its biggest outer diameter portion or position, against the stop plate 13 and rotates with its outer diameter gradually reducing, the piston 14 is pulled by the elastic element 15 towards left.

In another embodiment, an elastic element 15 may provide an elastic pushing force in a direction from left towards right so as to push the piston 14 towards right. In the embodiment, an eccentric wheel 12' is provided at a right side of the stop plate, such as the second eccentric wheel 12', which counteracts the elastic pushing force of the elastic element 15 and pushes the piston 13 to translate.

In another embodiment of the present disclosure, the automatic transfer portion further includes: a communication conduit 19. An inlet port of the communication conduit 19 is connected to the reservoir 18, and an outlet port of the communication conduit 19 is connected to the piston conduit. The outlet port of the communication conduit 19 is configured adjacent to an end of the piston conduit such that, when the piston 14 is translated, the liquid calibration sample in the communication conduit 19 is allowed to be suctioned to a space, which is defined between an end face of the piston 14 and an inner end face of the piston conduit, in the piston conduit. According to the configuration of the embodiment of the present disclosure, the automatic calibration device 10 is provided with the reservoir 18 and the communication conduit 19 such that the calibration sample may be transferred within the automatic calibration device 10 and will not contact outside ambient, which is advantageous particularly for a volatile liquid sample. As such, the amount of the liquid sample transferred by the automatic calibration device 10 can be constant accurately, which is favor of detection. The inlet port of the communication conduit 19 has a diameter ranged from 0.5 mm to 1 mm; however, it may have a diameter in other value.

A one-way valve 17 may be provided at the outlet port of the communication conduit 19. In FIG. 1, when the first eccentric wheel 12 drives the piston 14 to move towards right, the one-way valve 17 is opened, and the calibration sample in the reservoir 18 flows into the piston conduit, that is, the calibration sample flows into the space defined by an end face of the piston 14 and an opposite inner end face of the piston conduit, in the piston conduit. When the piston 14 moves towards left, the one-way valve 17 closes the outlet port of the communication conduit 19 and the liquid calibration sample can only be outputted from an outlet port in the end face of the piston conduit. A rubber plug 16 may be provided at the end of the piston conduit and an outlet be disposed in the rubber plug 16 such that the liquid calibration sample may be outputted from the outlet. Herein, the one-way valve 17 is configured such that the liquid calibration sample may enter the piston conduit through the one-way valve 17 and be blocked from flowing into the communication conduit 19. Further, the rubber plug 16 is also configured in such an one-way manner that the liquid calibration sample may flow from right side to left side as shown in FIG. 1, and cannot flow from the left side to the right side, that is, the liquid calibration sample may be outputted from the piston conduit through the rubber plug 16 to outside while air or liquid in environment is blocked by the rubber plug 16 from entering the piston conduit.

In another embodiment of the present disclosure, the automatic transfer portion further includes: a transferring pipe 110 fluidly communicated with the piston conduit such that the liquid calibration sample in the piston conduit may be transferred to an ion migration spectrometer through the transferring pipe 110. The transferring pipe 110 may be configured to include a transferring pipe inner portion 112 and an transferring pipe outer portion 111, and a gap is defined between the transferring pipe inner portion 112 and the transferring pipe outer portion 111 to transfer liquid therethrough. The portion in the circle line in FIG. 1 of the transferring pipe 100 is enlarged by about 8 times and shown at top-left side. The transferring pipe inner portion 112 has an inner diameter of 0.1 mm and an outer diameter of 0.3 mm, and the transferring pipe outer portion 111 has an inner diameter of 0.5 mm and an outer diameter of 0.8 mm. The gap is defined between the outer diameter of the transferring pipe inner portion 112 and the inner diameter of the transferring pipe outer portion 111, so that the liquid may be injected through the gap. The transferring pipe 110 according to the embodiment of the present disclosure is advantageous as an injection of liquid calibration sample in an order of micro-litre can be achieved. According to the embodiment of the present disclosure, by cooperating injection by the piston driven by the eccentric wheel with the transferring pipe, the automatic calibration device 10 may not only inject the liquid calibration sample but also sufficiently disperse the injected liquid calibration sample. When the electric machine 11 operates, the eccentric wheel may be rotated automatically, thereby achieving continuous injection of the liquid calibration sample in the order of micro-litre.

Embodiments of the present disclosure further provide an ion migration spectrometer including the automatic calibration device 10 as described above.

In an embodiment of the present disclosure, the ion migration spectrometer may further include a circuit control board, a display screen, and the like, for control and operation of the apparatus.

For example, a user may input, via the display screen, a preset amount value for liquid calibration sample to be transferred and the circuit control board may control the electric machine 11 to rotate the first eccentric 12 for preset number of circles. Upon driving of the first eccentric wheel 12, the piston 14 reciprocates for preset number of strokes such that preset amount of the liquid calibration sample is outputted and transferred into the ion migration spectrometer through the transferring pipe 110 for measurement.

Although some embodiments according to general concept of the present disclosure are illustrated and described, it is understood that the embodiments may be modified without departing from the principle and spirits of the general concept of the present disclosure. The scope of the present invention is defined by the claims and their equivalents.

The invention claimed is:

1. An ion migration spectrometer comprising an automatic calibration device, comprising:
   a reservoir configured to store liquid calibration sample therein; and
   an automatic transfer portion communicated with the reservoir and configured to transfer the liquid calibration sample in the reservoir;
   wherein the automatic transfer portion further comprises:
   a transferring pipe configured to transfer the liquid calibration sample from the reservoir to an ion migration spectrometer through the transferring pipe; and the reservoir and the automatic transfer portion are an integral structure
   a piston conduit arranged within the automatic transfer portion and configured to be fluidly communicated with the reservoir;
   a piston configured, within the piston conduit, to reciprocate right and left so as to output a user-selected preset amount of liquid calibration sample in the piston conduit that is transferred from the reservoir;
   a first eccentric wheel configured to abut against a stop plate, that is connected with the piston, so as to push, by its rotation, the stop plate and in turn the piston to move in a radial direction of the first eccentric wheel, and the first eccentric wheel is replaceable such that different amounts of calibration sample are allowed to be transferred by using eccentric wheels with different sizes so that the order of the transferred volume may be achieved by configuring a size of the first eccentric wheel; and
   a second eccentric wheel having a same dimension as the first eccentric wheel and configured to abut against the stop plate at a side of the stop plate opposite to the first eccentric wheel so as to cooperate with the first eccentric wheel to rotate together in a same direction or in opposite directions such that the stop plate reciprocates.

2. The automatic calibration device according to claim 1, wherein the automatic transfer portion further comprises:
   an electric machine configured to drive the first eccentric wheel and the second eccentric wheel to rotate.

3. The automatic calibration device according to claim 2, wherein the first eccentric is continuously rotatable such that a total amount of the liquid calibration sample transferred by the piston is obtained by multiplying the amount at one circle of rotation of the first eccentric wheel with the number of circles of rotation of the first eccentric wheel.

4. The automatic calibration device according to claim 1, wherein the automatic transfer portion further comprises:
   an elastic element configured to provide an elastic force in a direction opposite to a direction of a force for driving the piston by the first eccentric wheel.

5. The automatic calibration device according to claim 1, wherein the automatic transfer portion further comprises a communication conduit, an inlet port of the communication conduit is connected to the reservoir, and an outlet port of the communication conduit is arranged adjacent to an end of the piston conduit and connected to the piston conduit such that, as the piston is moved, the liquid calibration sample in the communication conduit is allowed to be suctioned to a space defined between an end face of the piston and an inner end face of the piston conduit, in the piston conduit.

6. The automatic calibration device according to claim 5, wherein the automatic transfer portion further comprises: a one-way valve provided at the outlet port of the communication conduit and configured to allow the liquid calibration sample to enter the piston conduit from the reservoir and to block the liquid calibration sample in the piston conduit from entering the reservoir.

7. The automatic calibration device according to claim 1, wherein the transferring pipe comprises a transferring pipe inner portion and a transferring pipe outer portion, and a gap is defined between the transferring pipe outer portion and the transferring pipe inner portion and configured for transferring of liquid.

* * * * *